United States Patent
Natale et al.

(10) Patent No.: US 12,202,194 B2
(45) Date of Patent: Jan. 21, 2025

(54) EQUIPMENT AND METHOD FOR THE THREE-DIMENSIONAL PRINTING OF CONTINUOUS FIBER COMPOSITE MATERIALS

(71) Applicant: MOI Composites S.R.L., Milan (IT)

(72) Inventors: Gabriele Natale, Milan (IT); Michele Tonizzo, Milan (IT)

(73) Assignee: MOI Composites S.R.L., Milan (IT)

( * ) Notice: Subject to any disclaimer, the term of this patent is extended or adjusted under 35 U.S.C. 154(b) by 304 days.

(21) Appl. No.: 17/753,190

(22) PCT Filed: Aug. 28, 2020

(86) PCT No.: PCT/IB2020/058033
§ 371 (c)(1),
(2) Date: Feb. 23, 2022

(87) PCT Pub. No.: WO2021/038503
PCT Pub. Date: Mar. 4, 2021

(65) Prior Publication Data
US 2022/0274331 A1 Sep. 1, 2022

(30) Foreign Application Priority Data
Aug. 30, 2019 (IT) .......................... 102019000015297

(51) Int. Cl.
*B29C 64/165* (2017.01)
*B29C 64/209* (2017.01)
(Continued)

(52) U.S. Cl.
CPC .......... *B29C 64/165* (2017.08); *B29C 64/209* (2017.08); *B29C 64/336* (2017.08);
(Continued)

(58) Field of Classification Search
CPC ... B29C 64/165; B29C 64/209; B29C 64/336; B29C 70/384; B33Y 10/00; B33Y 30/00; B33Y 40/00; B33Y 70/00; B29B 15/12
See application file for complete search history.

(56) References Cited

U.S. PATENT DOCUMENTS 5,936,861 A    8/1999 Jang et al.
2014/0361460 A1 12/2014 Mark
(Continued)

FOREIGN PATENT DOCUMENTS

CN    108372658 A    8/2018
CN    108381924 A    8/2018

OTHER PUBLICATIONS

International Search Report and Written Opinion issued in PCT Application PCT/IB2020/058033, mailing date Nov. 16, 2020.

*Primary Examiner* — Jacob T Minskey
*Assistant Examiner* — Elisa H Vera

(57) ABSTRACT

Equipment and a method for the three-dimensional printing of continuous fiber composite materials are described, and the equipment comprises:—a supplying head (1) to supply at least one filiform element of continuous fiber (4) comprising at least one fiber;—a movement assembly for the relative movement between the supplying head (1) and the three-dimensional object (20) so as to exert traction of the continuous filiform element (4);—a coupling unit to couple a quantity of material powder onto said filiform element (4); said coupling unit (2) being configured to deposit a determined quantity of powder on the continuous filiform element so as to form a prepreg filiform element (4');—an energy source (6) configured to induce a phase change to the prepreg filiform element (4') from the solid state to the liquid state; said energy source (6) being positioned downstream of said coupling unit (2).

24 Claims, 6 Drawing Sheets

(51) Int. Cl.
*B29C 64/336* (2017.01)
*B33Y 10/00* (2015.01)
*B33Y 30/00* (2015.01)
*B33Y 40/00* (2020.01)

(52) U.S. Cl.
CPC .............. *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2018/0126720 A1 | 5/2018 | Tyler et al. | |
| 2019/0009472 A1* | 1/2019 | Mark | B29C 64/393 |
| 2019/0202120 A1* | 7/2019 | Budge | B22F 12/38 |
| 2019/0315055 A1* | 10/2019 | Tyler | B29C 64/118 |

\* cited by examiner

EQUIPMENT AND METHOD FOR THE THREE-DIMENSIONAL PRINTING OF CONTINUOUS FIBER COMPOSITE MATERIALS

FIELD OF THE INVENTION

The present invention concerns the field of the three-dimensional printing of composite materials.

In particular, the present invention concerns equipment and a method for the three-dimensional printing of continuous fiber composite materials and thermoplastic or thermosetting matrix.

KNOWN ART

As known, the term "composite" generally means a material obtained by combining two or more components so that the final product has properties different from those of the individual constituents. In order to better identify what is meant by the term "composite" in the technical field, it is customary to limit the class of composite materials to reinforced materials only, wherein at least one component, usually in the form of fibers, has much greater mechanical characteristics than the others.

Generally, the association, by adhesion or cohesion, of two or more components different in shape and chemical composition, which are insoluble in each other and separated by an interface, can be defined as "composite material" or simply "composite".

The composites generally consist of a continuous phase (named matrix) and a discontinuous phase (which is named reinforcement). The mechanical properties of the material (resistance and rigidity) are mainly entrusted to the discontinuous phase, whereas the task of transferring the external loads applied to the discontinuous phase is entrusted to the continuous phase. This transmission occurs by the effect of tangential stresses. Moreover, in addition to stabilizing the composite by compression, the matrix has the function of holding together and protecting the fibers and of shaping the piece.

Ultimately, a composite material is a multiphase material which can be created artificially and which is different from the constituents: depending on the principle of the combined actions, the optimization of a property is obtained by means of the careful and studied combination of two or more different materials.

Depending on the material of the matrix constituting the continuous phase, the composites are classified as a metal matrix, a ceramic matrix and a polymer matrix.

The polymer matrix composite materials generally consist of synthetic fibers (for example carbon, nylon, aramid or glass) incorporated into a polymer matrix which surrounds, protects and binds the fibers. Typically, the fibers constitute about 50/60% by volume of a polymer matrix composite.

In turn, there are two subclasses of materials composing the polymer matrix within the polymer matrix category, these are: thermoplastic polymers and thermosetting polymers.

The thermoplastic polymers are a group of plastic materials which acquire malleability under the action of temperature. Subjected to the action of temperature, the thermoplastic polymers can be molded or shaped into finished objects and can, thus, return to being rigid structures once cooled. In fact, the viscosity decreases with the increasing of temperature, but also with the increasing of the shear rate and shear stress. This heating/cooling cycle can theoretically be repeated several times depending on the quality of the different plastic materials; in practice, it is possible to repeat the cycle for a limited number of times since too many heating cycles can degrade the polymers.

The thermosetting polymeric materials have a lattice molecular structure formed by covalent bonds. The thermosetting polymers are cross-linked by means of a process named "Curing," through which the resin undergoes a series of transformations in the fluid state, passing through a gelled or rubbery state until passing to the vitreous state. Some thermosetting resins are cross-linked by means of heat or through heat and pressure combined. In other cases, the chemical reaction can occur at room temperature (cold thermosets) by means of light radiation, evaporation of substances, activation by means of humidity and, finally, due to the forced mixing of two elements (generally resin and catalyst).

Although the thermosetting resin artifacts can soften by the effect of heat (Tg, glass transition temperature), the covalent bonds of the network prevent them from returning to the fluid state that existed prior to the crosslinking, in fact, if heating involves exceeding the degradation temperature, they decompose and carbonize. The thermosetting materials cannot thus be reheated and thus melted as occurs with thermoplastics.

Processes for the three-dimensional printing of composite materials are for example described in U.S. Pat. Nos. 9,987,798, 10,011,073 and 9,126,367.

The Applicant has observed that the known processes for the three-dimensional printing of continuous fiber composite materials are intrinsically linked to the type of thermoplastic or thermosetting material intended to be used to make the matrix of the composite material. In other words, the selection of the material determines the three-dimensional printing process.

The Applicant has further noted that precisely for such reason, to date, the processes for the three-dimensional printing of composite materials with thermoplastic matrix are the most widely used.

The Applicant has thus encountered the need for a process and the respective equipment for the three-dimensional printing of continuous fiber composite material which is the same regardless of the type of material, thermoplastic or thermosetting, intended to be used to make the matrix of the composite material to be printed.

SUMMARY OF THE INVENTION

Thus, in its first aspect, the invention concerns equipment for the three-dimensional printing of continuous fiber composite materials, comprising:

a supplying head to supply at least one continuous filiform element comprising at least one fiber;

a movement assembly for the relative movement between the supplying head and the three-dimensional object so as to exert traction of the continuous filiform element;

a deposition unit for depositing a quantity of powder onto said filiform element so as to form a prepreg filiform element; said deposition unit being configured to deposit a determined quantity of powder on the filiform element;

an energy source configured to induce a phase change to the prepreg filiform element from the solid state to the liquid state; said energy source being positioned downstream of said deposition unit.

In the solution suggested, there is the possibility to use both thermoplastic and thermosetting materials with the same printing apparatus and method, by using a material forming the composite material powder.

In the aforesaid aspect, the present invention can have at least one of the preferred characteristics described hereunder.

Preferably, the coupling unit is housed at least partially inside the supplying head so that the coupling between the determined quantity of powder and the continuous filiform element occurs inside the supplying head.

Advantageously, the coupling unit is housed in a dedicated station placed upstream of the supplying head so that the coupling between the determined quantity of powder and the continuous filiform element occurs in a lapse of time such as to allow said quantity of powder to be deposited on the filiform element so as to also affect the most inner fibers. Advantageously, the energy source is configured to subject the quantity of powder to a quantity of energy so that to lead said quantity of powder to a melting temperature or greater than 0.7 Tg, Tg being the glass transition temperature of the powder material, so that to at least partially embed the continuous filiform element.

Conveniently, the coupling unit is configured to combine the quantity of powder with the continuous filiform element by spraying.

Preferably, the coupling unit is configured to combine the quantity of powder with the continuous filiform element by dispersion.

Advantageously, the equipment comprises a cutting member.

Conveniently, the energy source is housed at least partially inside the supplying head.

According to a further aspect, the present invention concerns a method for the three-dimensional printing of continuous fiber composite materials, comprising the steps of:
  supplying at least one filiform element comprising at least one continuous fiber to a supplying head;
  combining a determined quantity of material powder for a matrix for composite materials with said filiform element so as to transform said continuous filiform element into a prepreg filiform element;
  subjecting the prepreg filiform element to a quantity of thermal energy such as to induce a phase change to the prepreg filiform element from the solid state to the liquid state;
  depositing the filiform element on a supporting surface and contemporaneously inducing a phase change from the liquid state to the solid state.

Preferably, the material powder appropriate for making a matrix for composite materials is selected among thermoplastic materials or thermosetting materials.

Conveniently, the method further has the steps of:
  creating a three-dimensional model of the object to be printed;
  generating the deposition paths of the supplying head;
  making the supplying head follow the paths generated by delivering the continuous filiform element onto a supporting surface.

Advantageously, the supplying and depositing steps are implemented by exerting a traction force on the continuous filiform element by means of the relative movement between a respective supplying head and a supporting surface or said three-dimensional object to be printed.

Conveniently, the method further comprises the steps of:
  spreading at least one end of the continuous filiform element or of its derivative onto a respective supporting surface; inducing at least one state change (solid/liquid, solid/liquid/solid) by melting or polymerizing the continuous filiform element or a derivative thereof onto the supporting surface so as to define a fixing point for fixing the continuous filiform element or a derivative thereof onto said surface; displacing the supplying head with respect to the fixing point according to a predetermined path that defines the object to be printed; and suddenly melting and cooling and/or polymerizing the prepreg filiform element during the step of displacing the supplying head so that to stabilize the composite material in a solid state.

Further characteristics and advantages of the invention will become clearer in the detailed description of some preferred, but not exclusive, embodiments of equipment and a method for the three-dimensional printing of continuous fiber composite materials according to the present invention.

BRIEF DESCRIPTION OF THE DRAWINGS

Such description will be set forth hereunder with reference to the accompanying drawings, only provided by way of example and thus not limiting, in which.

DETAILED DESCRIPTION OF EMBODIMENTS OF THE INVENTION

With reference to the figures, equipment for the three-dimensional printing of continuous fiber composite materials is denoted in its entirety by the numerical reference 100. In particular, the equipment 100 is adapted to the printing of a composite material 2 consisting of at least two elements, in particular at least one continuous fiber (or long fiber), which has the task of supporting the fillers; and a matrix, which holds said at least one fiber joined, thus protecting it from the outer environment.

Generally, several continuous or long fibers are joined together to form a continuous filiform element 4.

Figure 1:
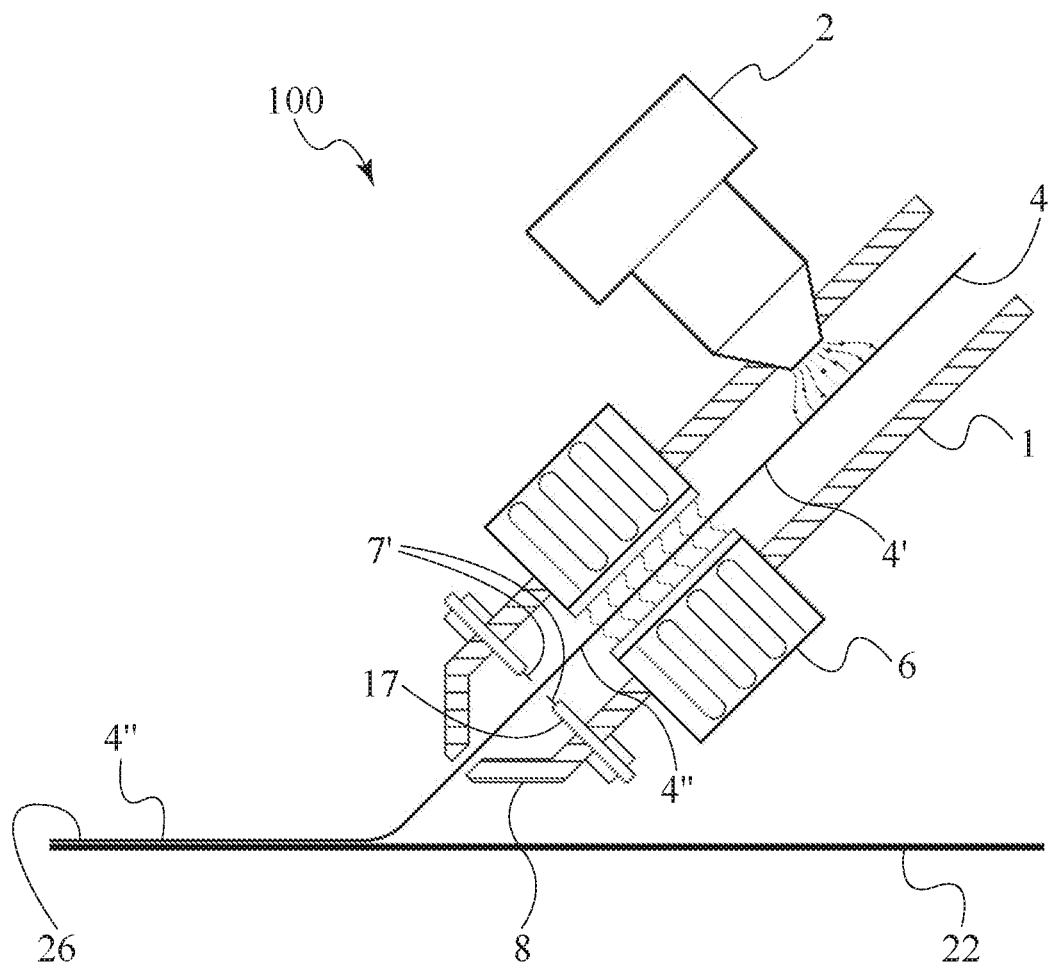
FIG. 1 shows a schematic side view of a first embodiment of the equipment for the three-dimensional printing of continuous fiber composite materials according to the present invention.

Moreover, there can be other additives or reinforcements in the composite material formed. With reference to FIG. 1, a number of fibers, appropriately joined together in a step of making the filiform composite material 4", can be processed so as to constitute an individual body. The fibers can also consist of different materials, among which for example glass fiber, carbon fiber, kevlar fiber, basalt fiber, natural fibers, etc. The fibers, which must be supplied continuously, are preferably collected to form a continuous filiform element 4.

As far as the matrix is concerned, a resin at the solid powder state is used.

The resin can be a thermosetting resin, for example an epoxy, acrylic, polyester resin, etc.

Alternatively, the resin can be a thermoplastic resin such as for example peek, nylon, polyethylene.

The equipment 100 comprises a supplying head 1 to supply a continuous filiform element 4 comprising at least one continuous fiber (or long fiber), a movement assembly for the relative movement between the supplying head 1 and the three-dimensional object 20 to be printed, so as to exert traction of the continuous filiform element 4, a coupling unit 2 to couple a quantity of powder 5 to the continuous filiform element 4, so as to form a prepreg filiform element 4', an energy source 6 configured to induce a phase change at least of the quantity of powder 5 coupled to the continuous filiform element 4 from the solid state to the liquid state, so as to embed it to make a filiform composite material 4".

In the context of the present description, prepreg filiform element 4' is understood as a filiform element 4 after a determined quantity of resin powder, thermoplastic or thermosetting material has been deposited thereon, but before the polymerization adapted to transform it into a filiform composite material 4" has occurred.

The supplying head 1 is advantageously supported by a movement assembly for the relative movement between the supplying head 1 itself and the three-dimensional object 20 to be printed.

During the supply of the continuous filiform element 4, the movement assembly exerts a traction force on the filiform element 4 or a derivative thereof and, thus, also on the continuous fibers contained therein.

"Derivative" of the continuous filiform element is understood as the product of a successive processing stage of the continuous filiform element, for example the prepreg filiform element or the filiform composite material.

In other words, the relative movement between the supplying head 1 and the object 20 determines a traction action on the material during the respective deposition.

Consequently, this traction force is also transferred to the continuous fibers.

It should be noted that this traction force causes the supply of the filiform element 4 itself into the supplying head 1.

Consequently, the greater the relative velocity, the faster the advancement of the filiform element 4 (and thus the shortest the time lapse during which the continuous filiform element 4 will remain in the supplying head 1).

In more detail, the movement means comprise at least one machine numerically controlled moved on at least three axes.

According to a first embodiment not shown in the figures, the numerical control machine comprises a motorized arm 23 to support the supplying head 1 mentioned above at a respective end portion.

The motorized arm 23, which is not described or shown in detail since of the known type, is adapted to move the head in the three spatial axes, by orienting the supplying head according to any position with respect to the object 20 and with respect to a supporting surface 22 onto which the object 20 is positioned during the printing process.

It should be noted that the supporting surface 22, which is arranged under the supplying head 1, can in turn be moved close to/away from the supplying head 1.

The coupling unit 2 is a device able to deliver a determined quantity of resin powder and to make it adhere to the filiform element 4.

The quantity of powder delivered is in the ratio of 30% to 70% by volume with respect to the fiber of the filiform element 4 itself.

Coupling units 2 adapted for the purpose can be represented by spraying members able to spray the resin powder on the filiform element 4 or by members containing a quantity of resin powder dispersed in a liquid through which the filiform element 4 passes.

The energy source 6 is positioned downstream of the coupling unit 2. According to a first embodiment shown in FIG. 1, the energy source 6 can consist of a heat emitting source provided to heat the prepreg filiform element 4' downstream of the coupling unit 2, this in particular whenever powder such as a thermo-activatable resin powder is used for the matrix.

The energy sources 6 of this type are generally based on the supply of a hot air flow or a laser source.

Alternatively, the energy source 6 can be a radiation emitter. In this case, the energy source 6 can for example consist of at least one LED or IR emitter, or laser emitter, or any other radiation source, and is positioned in the supplying head 1 directly downstream of the coupling unit 2 and upstream of the delivery nozzle 8 for delivering the filiform element 3 or a derivative thereof.

In the embodiment shown in FIG. 1, downstream of the energy source 6 but upstream of the delivery nozzle 8, there is a cutting member 7 which can be represented by at least one movable blade 7' movable close to/away from each other to cut the filiform composite material 4".

According to this embodiment, the cutting member 7 acts on the filiform composite material 4" after it has been applied onto the supporting surface 22.

Figure 2:
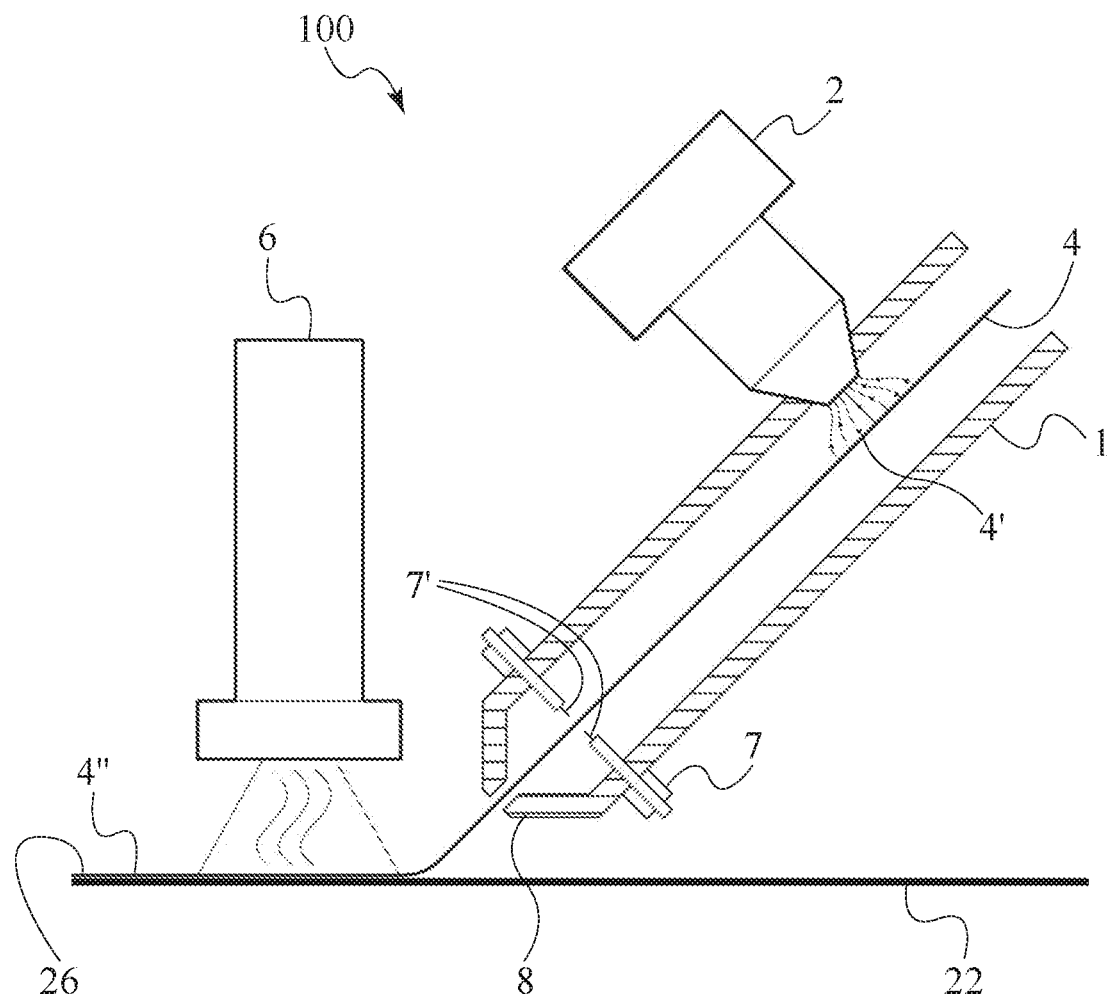
FIG. 2 shows a schematic side view of a second embodiment of the equipment for the three-dimensional printing of continuous fiber composite materials according to the present invention, wherein the energy source is outside and downstream of the supplying head.

An alternative embodiment of the equipment 100 for the three-dimensional printing of continuous fiber composite materials according to the present invention and quite similar to the embodiment of FIG. 1, except for the fact that the energy source 6 is positioned downstream of the coupling unit 2 and of the cutting member 7, is shown in FIG. 2.

In particular, the energy source 6 is also positioned downstream of the delivery nozzle 8 so as to polymerize the prepreg filiform element 4' after its deposition onto the supporting surface 22.

Figure 5:
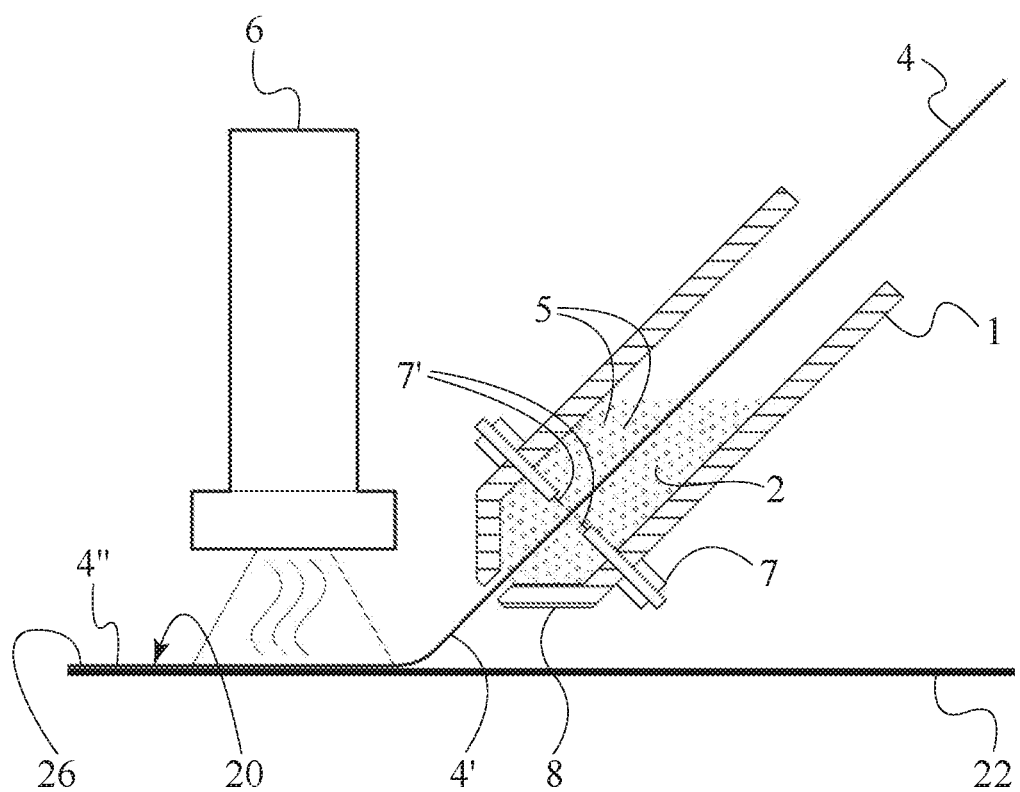
FIG. 5 shows a schematic side view of a fifth embodiment of the equipment for the three-dimensional printing of continuous fiber composite materials according to the present invention, wherein the energy source is outside and downstream of the supplying head.
Figure 6:
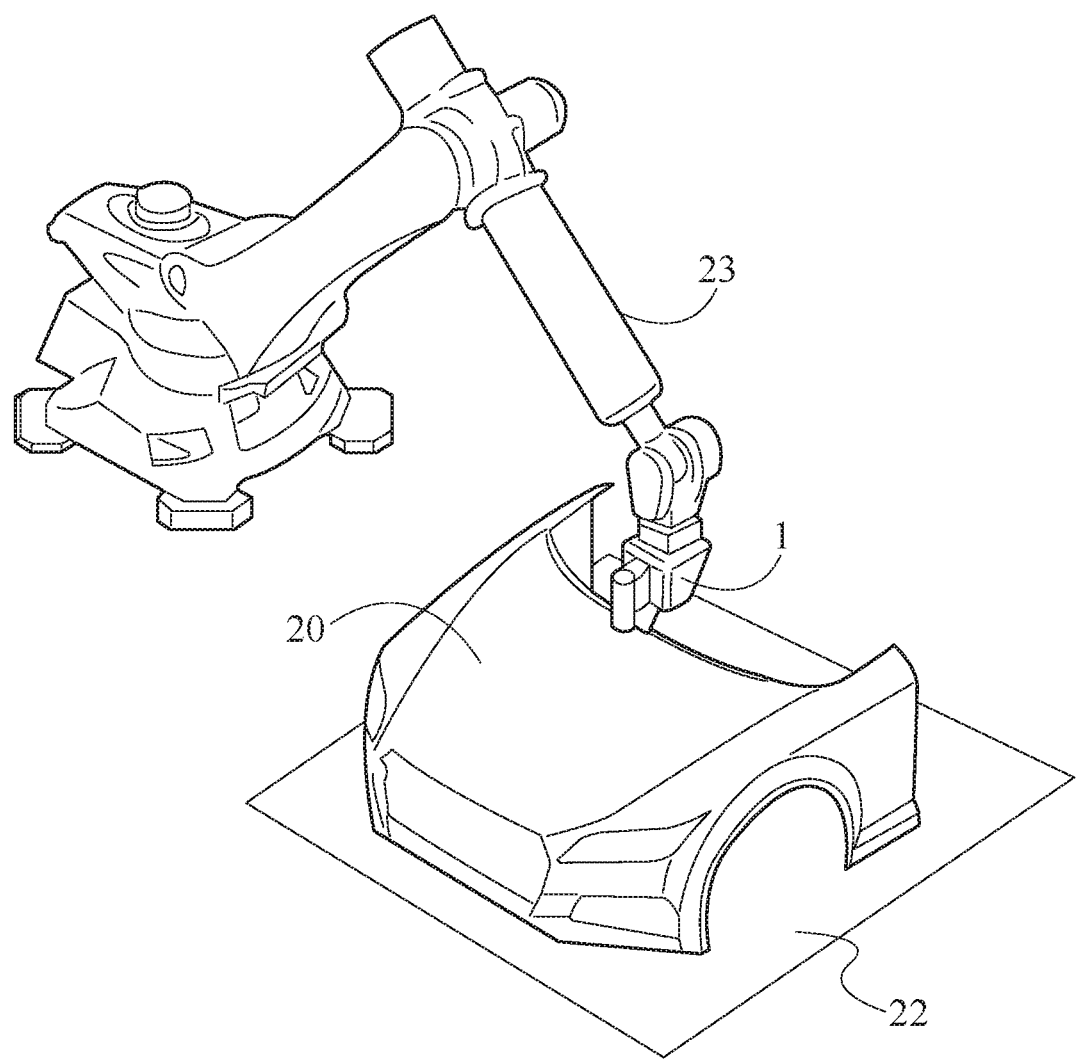
FIG. 6 shows a schematic perspective view of a numerical control machine represented by a motorized arm supporting a supplying head to supply the filiform element during the printing of at least one portion of a composite component.

An alternative embodiment of the equipment 100 for the three-dimensional printing of continuous fiber composite materials according to the present invention and quite similar to the embodiment of FIG. 2 is shown in FIG. 5, in this case, the coupling unit 2 is still arranged inside the supplying head 1, but is made of a bath containing a determined quantity of dispersed powder 5 appropriate for making a composite material matrix.

Figure 4:
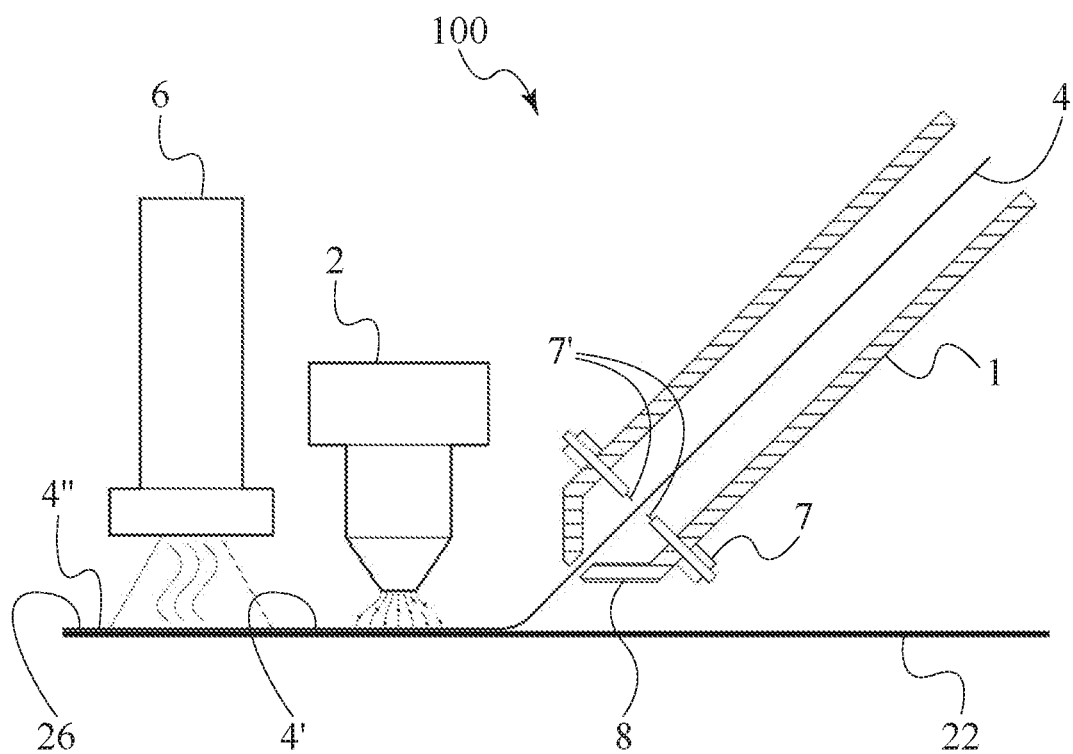
FIG. 4 shows a schematic side view of a fourth embodiment of the equipment for the three-dimensional printing of continuous fiber composite materials according to the present invention, wherein the coupling unit and the energy source are outside and downstream of the supplying head.

An alternative embodiment of the equipment 100 for the three-dimensional printing of continuous fiber composite materials according to the present invention is shown in FIG. 4, wherein both the coupling unit 2 and the energy source 6 to polymerize the prepreg filiform element 4' are arranged outside and downstream of the supplying head 1.

Figure 3:
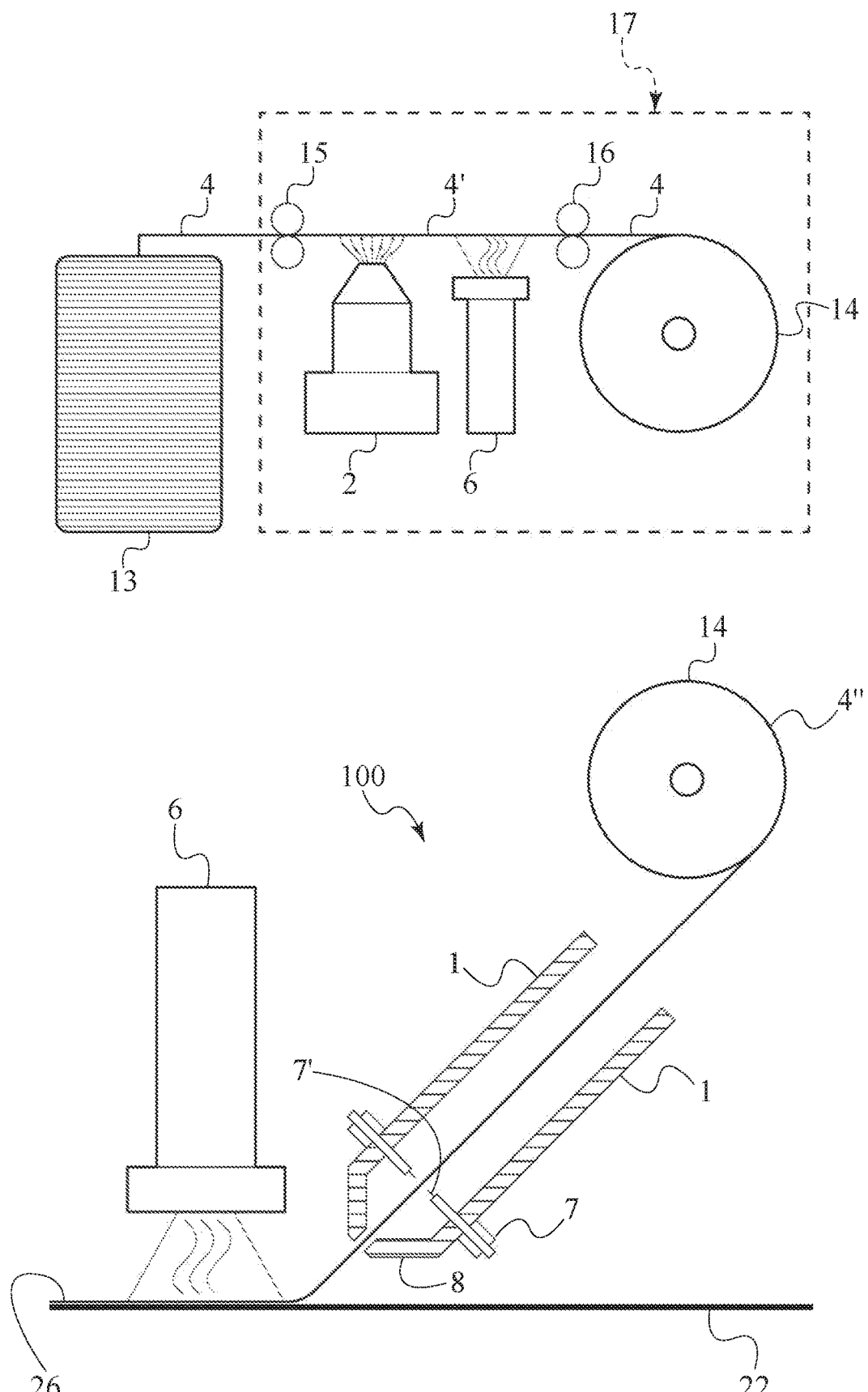
FIG. 3 shows a schematic side view of a third embodiment of the equipment for the three-dimensional printing of continuous fiber composite materials according to the present invention, wherein the prepreg filiform element is made upstream of the supplying head and stored on a reel.

An alternative embodiment of the equipment 100 for the three-dimensional printing of continuous fiber composite materials according to the present invention is shown in FIG. 3, wherein the prepreg filiform element 4' is made upstream of the supplying head 1 and stored on a storage reel 14.

In particular, in this case, the equipment 100 comprises a preparation station 17 to prepare the prepreg filiform element 4' arranged upstream of the supplying head 1.

In the preparation station 17, the filiform element 4, unwound from an appropriate reel 13, is first led, through a path guided by couples of rollers 15, 16, at the coupling unit 2 and subsequently at an energy source 6' where it is administered a determined quantity of energy.

The quantity of energy applied to the prepreg element 4' does not polymerize it, but is used to better make the resin powder stick to the continuous filiform element 4.

The preparation station 17 comprises a storage reel 14 downstream of the couples of rollers 15, 16.

The prepreg filiform element 4' is sent from the storage reel 14 to the supplying head 1 to be deposited onto the supporting surface 22.

A second energy source 6, configured to deliver a determined quantity of energy to the filiform composite material 4", preferably heat and adapted to polymerize and thus transform it into the filiform composite material 4", is placed downstream of the supplying head 1.

According to an embodiment shown in FIG. 3, the filiform composite material 4" is made discontinuously, the printing method in this case comprises a first process wherein the filiform element 4 is transformed into a prepreg filiform element 4' upstream of the supplying head 1 and preferably wound on a storage reel 14 and a second process wherein the prepreg filiform element 4' is sent to the supplying head 1 to be deposited.

Said first and second processes being temporally separate, i.e. occurring at two different times. In all embodiments of FIGS. 1 to 5, the supplying head 1 is advantageously supported by respective means for the relative movement between the supplying head 1 itself and the three-dimensional object 20 to be printed.

During the supply of the filiform element 4 to the supplying head 1, the movement means exerts a traction force onto the filiform element 4 and, thus, also on the continuous fiber 3 contained therein.

In other words, the relative movement between the supplying head 1 and the object 20 to be printed determines a traction action on the filiform composite material 4" during the respective deposition.

Consequently, this traction force is also transferred to the fibers.

It should be noted that this traction force causes the supply of the filiform element 4 itself into the supplying head.

In more detail, the movement means 18 comprise at least one machine numerically controlled moved on at least three axes.

According to a first embodiment not shown in the figures, the numerical control machine comprises a motorized arm to support the supplying head 1 mentioned above at a respective end portion.

The motorized arm 23, which is not described or shown in detail since of the known type, is adapted to move the head in the three spatial axes, by orienting the supplying head according to any position with respect to the object 10 and with respect to a supporting surface 22 onto which the object 10 is positioned during the printing process.

It should be noted that the supporting surface 22, which is arranged under the supplying head 1, can in turn be moved close to/away from the supplying head 1.

The present invention further concerns a method for the three-dimensional printing of continuous fiber composite materials which comprises the steps of:

supplying at least one filiform element 4 comprising at least one continuous fiber to a supplying head 1;

combining a determined quantity of material powder for a matrix for composite materials with said filiform element so as to transform said continuous filiform element into a prepreg filiform element;

subjecting the prepreg filiform element to a quantity of thermal energy such as to induce a phase change to the prepreg filiform 4' element from the solid state to the liquid state; and depositing the filiform element on a supporting surface 22;

inducing the change from liquid to solid state by suddenly lowering the temperature with respect to the Tg of the material or curing.

Generally, the quantity of thermal energy such as to induce a phase change to the prepreg filiform element 4' from a solid state to a liquid state is a quantity of thermal energy such as to lead the prepreg element 4' or the powdered polymer arranged thereon to a melting temperature or greater than 0.7 Tg, Tg being the glass transition temperature of the powder.

This supply and deposition process is carried out by exerting a dragging force on the filiform element 4 achieved by means of the relative movement between the supplying head 1 and the three-dimensional object 20 to be printed.

In other words, by displacing the supplying head 1 by means of the action of the numerical control machine, the filiform element 4 is deposited gradually so that to form the three-dimensional object 20 that is designed with the consequent supply of the filiform element 4 and continuous fibers contained therein.

More in detail, in order to carry out the printing process, the continuous filiform element 4 or a derivative thereof coming out of the supplying nozzle 8 is initially spread on the respective supporting surface 22.

At this point, the continuous filiform element 4 or a derivative thereof is suddenly melted and cooled or polymerized by the energy source 6 on the supporting surface 22 so that to define a fixing point 26 to fix the supporting element to the composite material 4".

In other words, as will become clearer hereunder, at the beginning of the process for depositing the filiform element 4 or a derivative thereof, a part of the filiform element 4 is already projected outside of the nozzle 8 of the supplying head 1.

When the equipment starts the printing process, the end of the supporting element 4 or of a derivative thereof is fixed to the supporting surface 22.

The transformation of the filiform element 4 into a composite material can occur at different points between the supplying head 1 and the supporting surface 22 depending on the type of equipment used.

In any case, the transformation occurs by combining a quantity of material (resin), appropriate for making a matrix for composite material, in the form of powder, with the filiform element 4.

The powder is selected among thermoplastic materials or thermosetting materials.

Types of thermoplastic materials adapted for the purpose can be Peek, Nylon, Polyethylene.

Types of thermosetting materials adapted for the purpose can be epoxy, polyester, polyurethane materials.

Generally, the combining step occurs at the supplying head 1 and, in particular, inside it, as shown in FIGS. 1, 2, 5.

In particular, in FIGS. 1 and 2, the combining step occurs by spraying, the combining unit 2 thus sprays a determined quantity of material powder appropriate for making a matrix for composite material on the filiform element 4.

Instead, in FIG. 5, the combining or coupling step occurs by dispersion, typically in this case inside the supplying head 1, the continuous filiform element 4 is made to pass through a bath containing the powder wherein the latter sticks onto the continuous filiform element 4 by dispersion.

At the end of this step, the filiform element 4 takes on the name of prepreg filiform element 4', but still is not a composite material 4" since the polymerization of the powder did not occur or, basically, the material is not in its final form.

The polymerization or melting occurs thanks to an energy source 6 able to deliver a determined quantity of energy, preferably heat, onto the prepreg filiform element 4'.

This step still occurs upstream of the combining step described previously, but can occur inside the supplying head 1, such as for example shown in FIG. 1, or outside the latter, such as for example shown in FIGS. 2-5.

In other words, in the latter cases precisely shown in FIGS. 2-5, the energy source 6 is arranged outside the supplying head 1 and subjects the prepreg filiform element 4' to a determined quantity of energy contemporaneously and after having been deposited onto the supporting surface 22.

In FIG. 4, not only the polymerization or melting, but also the combining step occur outside the supplying head 1. In fact, in this case the combining unit 2, and not just the energy source 6, is also arranged outside the supplying head 1, in particular downstream of the latter.

In this case, the combining step preferably occurs by spraying and the filiform element 4 is sprayed with a determined quantity of powder of a material appropriate for constructing the matrix for a composite material, after having been deposited onto the supporting surface 22. Thus, in this case, the polymerization also occurs downstream of the supplying head 1, when the filiform element 4, now prepreg filiform element 4', is deposited onto the supporting surface 22.

In all cases shown in the figures, at the beginning of the printing process, an end of the filiform element 4' coming out of the supplying head is constrained to the printing surface 22 at a fixing point, for example through polymerization or sudden lowering of the temperature of the filiform element at the molten state.

The fixing point 26 thus formed allows the filiform element 4 or a derivative thereof to be arranged on the printing surface 22 according to a precise path and to design the object 20 to be printed, while the numerical control machine 19 is moving.

The supplying head 1 is thus displaced by the numerical control machine 1 according to a predetermined path defining the object 20 to be printed.

This path is determined by proper management software which is not described in the present description since it is not part of the scope of the invention.

At the end of the printing process, or anyhow when the continuous supply of the filiform element 4 must be interrupted, the filiform element or a derivative thereof is cut by the blades 7'.

An alternative embodiment of the method for the three-dimensional printing of continuous fiber composite materials according to the present invention is schematically shown in FIG. 3.

In particular, in this case, the combining step and the impregnation step occur upstream of the supplying head 1 and, generally, at a moment time-shifted with respect to the printing.

In other words, in an appropriate station 17, the filiform element 4 is unwound by an appropriate reel 13 through a path guided by couples of rollers 15, 16 and is thus lead first at the combining unit 2, where a determined quantity of powder of an appropriate material for constructing the matrix for a composite material is preferably deposited thereon by spraying and subsequently at an energy source 6' where it is administered a determined quantity of energy.

The quantity of energy administered through the energy source 6' is used to make the polymeric powder better adhere to the continuous filiform element 4 which has become a prepreg filiform element 4' at this point.

At this point, thus transformed into a prepreg filiform element 4', the filiform element 4 is wound on a storage reel 14.

From the storage reel 14, whenever required, the prepreg filiform element 4' is sent to the supplying head 1 to be deposited onto the supporting surface 22, thanks to the robotic arm.

In order to make the composite material adhere to the fixing surface 22 and subsequently permanently transform the prepreg filiform element 4' into a filiform composite material 4", the same is subjected again by a second energy source 6 to a determined quantity of energy, preferably heat and able to induce a phase change to the prepreg filiform element 4' from the solid state to the liquid state.

According to an embodiment shown in FIG. 3, the filiform composite material 4" is made discontinuously, the printing method in this case comprises a first process wherein the filiform element 4 is transformed into a prepreg filiform element 4' upstream of the supplying head 1 and preferably wound on a storage reel 14 and a second process wherein the prepreg filiform element 4' is sent to the supplying head 1 to be deposited.

Said first and second processes being temporally separate, i.e. occurring at two different times.

Advantageously, the method in its various embodiments described above allows to make artifacts without necessarily performing a conventional linear "division," i.e. the division of the object to be printed into layers in parallel with the printing surface.

The material 2 gradually supplied to the head 8 is polymerized or melted and cooled and made to adhere to the other layers already deposited (in virtue of the adhesive characteristics of the resin), thus allowing the continuous designing action which affects the fibers contained.

Moreover, with the method described above, the process in no longer constrained to the type of material intended to be used for the matrix, in other words, both thermoplastic and thermosetting materials, which are combined in the form of powder with the continuous filiform element 3, can be used.

Several changes can be made to the embodiments described in detail, anyhow remaining within the protection scope of the invention, defined by the following claims.

The invention claimed is:

1. An equipment (100) for the three-dimensional printing of continuous fiber composite materials, comprising:
   a supplying head (1) to supply at least one filiform element of continuous fibers (4) comprising at least one fiber;
   a movement assembly for the relative movement between the supplying head (1) and the three-dimensional object to be printed (20) so as to exert traction of the continuous filiform element (4);

a coupling unit (2) to couple a quantity of material powder for a composite material matrix on said continuous filiform element (4); said coupling unit (2) being configured to combine a determined quantity of powder with the continuous filiform element (4) so as to form a prepreg filiform element (4'), said coupling unit (2) disposed upstream of a delivery nozzle (8); and an energy source (6) configured to direct energy to the prepreg filiform element (4') when said prepreg filiform element (4') is inside said supplying head (1); said energy source (6) being positioned downstream of said coupling unit (2).

2. The equipment (100) for the three-dimensional printing of continuous fiber composite materials according to claim 1, characterized in that said coupling unit (2) is housed at least partially inside the supplying head (1) so that the coupling between the determined quantity of powder and said continuous filiform element (4) occurs inside the supplying head (1).

3. The equipment (100) for the three-dimensional printing of continuous fiber composite materials according to claim 1, characterized in that said energy source (6) is configured to subject said quantity of powder to a quantity of energy so that to lead said quantity of powder to a melting temperature or greater than 0.7 Tg, Tg being the glass transition temperature of the powder material, so that to at least partially embed the continuous filiform element (4).

4. The equipment (100) for the three-dimensional printing of continuous fiber composite materials according to claim 1, characterized in that said coupling unit (2) is configured to combine said quantity of powder with said continuous filiform element (4) by spraying.

5. The equipment (100) for the three-dimensional printing of continuous fiber composite materials according to claim 1, characterized in that said coupling unit (2) is configured to combine said quantity of powder with said continuous filiform element (4) by spraying said powder directly on said continuous filiform element (4), said powder comprising a thermoplastic material.

6. The equipment (100) for the three-dimensional printing of continuous fiber composite materials according to claim 1, characterized in that the coupling unit (2) is housed in a dedicated station placed upstream of the supplying head (1) so that the coupling between said determined quantity of powder and said continuous filiform element (4) occurs in a lapse of time such as to allow said quantity of powder to be deposited on the filiform element so as to also affect the most inner fibers.

7. The equipment (100) for the three-dimensional printing of continuous fiber composite materials according to claim 1, characterized in that said energy source (6) is housed at least partially inside the supplying head (1).

8. The equipment (100) for the three-dimensional printing of continuous fiber composite materials according to claim 1, wherein the coupling unit (2) is adapted to couple said quantity of material powder for a composite material matrix on said filiform element (4) as said continuous filiform element (4) moves past the coupling unit (2).

9. The equipment (100) for the three-dimensional printing of continuous fiber composite materials according to claim 1, wherein the energy source (6) is configured to induce a phase change to the prepreg filiform element (4') from the solid state to the liquid state.

10. The equipment (100) for the three-dimensional printing of continuous fiber composite materials according to claim 1, further comprising a further energy source (6) disposed downstream of delivery nozzle (8) and configured to direct energy to the prepreg filiform element (4') and transform said prepreg filiform element (4') to a filiform composite material (4").

11. The equipment (100) for the three-dimensional printing of continuous fiber composite materials according to claim 1, wherein said coupling unit (2) and said energy source (6) are adapted to form said prepreg filiform element (4') discontinuously and further comprising a storage reel for temporarily collecting said discontinuously made prepreg filiform element (4').

12. A method for the three-dimensional printing of continuous fiber composite materials, comprising the steps of:

supplying at least one continuous filiform element (4) comprising at least one continuous fiber to a supplying head (1);

combining a determined quantity of material powder for a matrix for composite materials with said continuous filiform element (4) so as to transform said continuous filiform element (4) into a prepreg filiform element (4');

after said step of combining and after said continuous filiform element (4) has been transformed into said prepreg filiform element (4'), subjecting said prepreg filiform element (4') to a quantity of thermal energy such as to induce a phase change to the prepreg filiform element (4') from the solid state to the liquid state;

depositing said prepreg filiform element (4') on a supporting surface (22) or a three-dimensional object (20) and inducing a phase change from the liquid state to the solid state, wherein the steps of combining and subjecting take place at different locations and wherein said step of subjecting said prepreg filiform element (4') to a quantity of thermal energy takes place when said prepreg filiform element (4') is inside said supplying head (1).

13. The method for the three-dimensional printing of continuous fiber composite materials according to claim 12, characterized in that the powder of said quantity of material powder for a matrix for composite materials is selected from thermoplastic materials and thermosetting materials and wherein said combining comprises spraying said powder directly on said continuous filiform element (4).

14. The method for the three-dimensional printing of continuous fiber composite materials according to claim 12, characterized by having the steps of:

creating a three-dimensional model of the object to be printed;

generating the deposition paths of a supplying head (1);

making the supplying head (1) follow the paths generated by delivering the continuous filiform element (4) or its derivative onto a supporting surface (22) or the three-dimensional object (20).

15. The method for the three-dimensional printing of continuous fiber composite materials according to claim 12, characterized in that said supplying and depositing steps are implemented by exerting a traction force on the continuous filiform element (4) by means of relative movement between a respective supplying head (1) and a supporting surface (22) or said three-dimensional object (20).

16. The method for the three-dimensional printing of continuous fiber composite materials according to claim 15, wherein said subjecting step takes place while exerting said traction force on the continuous filiform element (4) by means of relative movement between a respective supplying head (1) and a supporting surface (22) or said three-dimensional object (20).

17. The method for the three-dimensional printing of continuous fiber composite materials according to claim 12, characterized by having the steps of:
- spreading at least one end of the prepreg filiform element (4') onto said respective supporting surface (22) or said three-dimensional object (20);
- wherein said depositing said prepreg filiform element (4') onto the supporting surface (22) or said three-dimensional object (20) defines a fixing point on said supporting surface (22) or said three-dimensional object (20); and further comprising
- displacing said supplying head (1) with respect to the fixing point according to a predetermined path that defines the object to be printed; and
- cooling and/or polymerizing the prepreg filiform element (4') during said displacing said supplying head (1), to stabilize the prepreg filiform element (4') as a composite material (4") in a solid state.

18. The method for the three-dimensional printing of continuous fiber composite materials according to claim 12, characterized in that a deposited filiform composite material (4") is made discontinuously, said method comprising:
- a first process wherein the filiform element (4) is transformed into a prepreg filiform element (4') and
- a second process wherein the prepreg filiform element (4') is subjected to said quantity of thermal energy and then directed to the supplying head (1) to be deposited as the filiform composite material (4").

19. The method for the three-dimensional printing of continuous fiber composite material according to claim 18, characterized in that said first and second processes occur at two different moments in time.

20. The method for the three-dimensional printing of continuous fiber composite materials according to claim 12, wherein said combining a determined quantity of material powder for a matrix for composite materials with said continuous filiform element (4) comprises spraying resin powder onto said continuous filiform element (4).

21. The method for the three-dimensional printing of continuous fiber composite materials according to claim 12, wherein said step of combining includes a coupling unit (2) that deposits said determined quantity of powder on the continuous filiform element (4), said step of subjecting takes place using an energy source (6) that induces said phase change, and said energy source is disposed downstream of said coupling unit (2).

22. The method for the three-dimensional printing of continuous fiber composite materials according to claim 12, wherein said step of subjecting takes place using an energy source (6) that induces said phase change and said depositing said filiform element on a supporting surface (22) or a three-dimensional object (20) includes a delivery nozzle (8) positioned downstream of the energy source (6).

23. The method for the three-dimensional printing of continuous fiber composite materials according to claim 12, further comprising a further energy source (6) directing energy to the prepreg filiform element (4') after said prepreg filiform element (4') exits said supplying head (1), to transform said prepreg filiform element (4') to a filiform composite material (4").

24. A method for the three-dimensional printing of continuous fiber composite materials, comprising the steps of:
- providing at least one continuous filiform element (4) comprising at least one continuous fiber;
- combining a determined quantity of material powder for a matrix for composite materials with said continuous filiform element (4) so as to transform said continuous filiform element (4) into a prepreg filiform element (4');
- after said step of combining and after said continuous filiform element (4) has been transformed into said prepreg filiform element (4'), subjecting said prepreg filiform element (4') to a quantity of thermal energy such as to induce a phase change to the prepreg filiform element (4') from a solid state to a liquid state;
- a supplying head (1) depositing said prepreg filiform element (4') on a supporting surface (22) or a three-dimensional object (20); and
- inducing a phase change from said liquid state to a solid state to form a deposited filiform composite material (4") from said deposited prepreg filiform element (4'), wherein
- said steps of combining and subjecting take place at different locations,
- said step of subjecting said prepreg filiform element (4') to a quantity of thermal energy takes place when said prepreg filiform element (4') is inside said supplying head (1),
- said deposited filiform composite material (4") is made discontinuously,
- said combining takes place upstream of the supplying head (1) and
- further comprising winding said prepreg filiform element (4') on a storage reel prior to said subjecting to said quantity of thermal energy and said depositing.

* * * * *